United States Patent
Bhide et al.

(10) Patent No.: US 9,348,856 B2
(45) Date of Patent: May 24, 2016

(54) DATA MOVEMENT FROM A DATABASE TO A DISTRIBUTED FILE SYSTEM

(71) Applicant: International Business Machines Corporation, Armonk, NY (US)

(72) Inventors: Manish A. Bhide, Hyderabad (IN); Veera R. Maddipati, Fremont, CA (US); Jean-Claude Mamou, Millbury, MA (US); Alan P. Plante, Holliston, MA (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/076,977

(22) Filed: Nov. 11, 2013

(65) Prior Publication Data

US 2015/0134609 A1    May 14, 2015

(51) Int. Cl.
*G06F 17/30* (2006.01)
*H04L 29/08* (2006.01)
*G06F 21/62* (2013.01)

(52) U.S. Cl.
CPC .... *G06F 17/30336* (2013.01); *G06F 17/30345* (2013.01); *G06F 17/30445* (2013.01); *G06F 17/30545* (2013.01); *G06F 21/6218* (2013.01); *H04L 67/1097* (2013.01); *G06F 17/303* (2013.01)

(58) Field of Classification Search
CPC .......... G06F 17/30194; G06F 17/3041; G06F 17/30427; G06F 9/4843
USPC .................. 707/755, 770, 771; 709/214, 217; 711/202; 717/103, 142
See application file for complete search history.

(56) References Cited

U.S. PATENT DOCUMENTS

| | | | | |
|---|---|---|---|---|
| 7,921,416 B2 * | 4/2011 | Fontoura | ........... | G06F 17/30427 707/623 |
| 8,543,596 B1 * | 9/2013 | Kostamaa | ......... | G06F 17/30194 707/770 |
| 2012/0284360 A1 * | 11/2012 | Bense | .................. | G06F 9/4843 709/217 |

FOREIGN PATENT DOCUMENTS

WO     2013106883     7/2013

OTHER PUBLICATIONS

"RushLoader for Hadoop", (online), retrieved from the Internet on Nov. 20, 2013 from URL>http://www.youtube.com/embed/1TDNFGmrm14, 1 page.

(Continued)

*Primary Examiner* — Hung Q Pham
(74) *Attorney, Agent, or Firm* — Janaki K. Davda; Konrad, Raynes, Davda and Victor LLP (57) ABSTRACT

Provided are techniques for data movement. An activity is created that overrides existing security, that is associated with a user, that defines one or more source tables in a relational database and one or more target tables that are available to the user for the activity, and that provides security credentials of an author of the activity for use by the user, wherein the one or more target tables represent data in one or more target files in a file system. The activity is executed using the security credentials of the author to move data in a source table of the one or more source tables to a target file of the one or more target files, wherein a target table of the one or more target tables is defined over the target file. Access is provided to the user to the moved data using the target table.

16 Claims, 5 Drawing Sheets

(56) References Cited

OTHER PUBLICATIONS

US Patent Application, dated Jun. 4, 2014, for U.S. Appl. No. 14/296,275 (54.115C1), filed Jun. 4, 2014, entitled "Data Movement From a Database to a Distributed File System", invented by Manish A Bhide et al., Total 36 pages.

Preliminary Amendment, dated Jun. 4, 2014, for U.S. Appl. No. 14/296,275 (54.115C1), filed Jun. 4, 2014, entitled "Data Movement From a Database to a Distributed File System", invented by Manish A Bhide et al., Total 5 pages.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

US Patent Application, dated Jul. 31, 2012, for U.S. Appl. No. 13/563,511 (57.301), filed Jul. 31, 2012, entitled, "Intent Based Automation of Data Management Operations by a Data Management Engine", invented by Holger Kache et al., pp. 1-52.

US Patent Application, dated May 10, 2013, for U.S. Appl. No. 13/892,104 (57.301C1), filed May 10, 2013, entitled, "Intent Based Automation of Data Management Operations by a Data Management Engine", invented by Holger Kache et al., pp. 1-50.

Ting, K., "Apache Sqoop: Highlights of Sqoop 2", dated Jan. 2012, pp. 1-30.

"Sqoop 2", dated Oct. 14, 2011, (online), retrieved from the Internet on Nov. 13, 2013 at URL>http://cwiki.apache.org//confluence/display/SQOOP/Sqoop+2, pp. 1-4.

"Sqoop User Guide (v1.4.3)", (online) retrieved from the Internet on Nov. 13, 2013 from URL>http:www.sqoop.apache.org/docs/1.4.3/sqoopUserGuide.html, pp. 1-41.

"Actian Rush Loader for Hadoop", (online), dated 2013,retrieved from the Internet on Nov. 19, 2013 from URL>http://bigdata.pervasive.com/Products/RushLoader-for-Hadoop.aspx, 1 page.

Office Action, dated Sep. 8, 2015, for U.S. Appl. No. 14/296,275 (54.115C1), filed Jun. 4, 2014 invented by Manish A Bhide et al., Total 20 pages.

Response to Office Action, dated Dec. 3, 2015, for U.S. Appl. No. 14/296,275 (54.115C1), filed Jun. 4, 2014 invented by Manish A Bhide et al., Total 8 pages.

Notice of Allowance, dated Mar. 7, 2016, for U.S. Appl. No. 14/296,275, filed Jun. 4, 2014 invented by Manish A Bhide et al., Total 18 pages.

* cited by examiner

DATA MOVEMENT FROM A DATABASE TO A DISTRIBUTED FILE SYSTEM

FIELD

Embodiments of the invention relate to data movement from a database to a distributed file system.

BACKGROUND

In today's complex Information Technology (IT) environments, the plethora of heterogeneous data sources pose a challenge for information architects, data scientists, and analysts. Some of the data is relational in nature and stored in a Relational DataBase Management System (RDBMS), while some of the data is contained in files in a distributed file system and processed by massively scalable big data systems, such as an Apache® Hadoop® Distributed File System (HDFS™). (Apache, Hadoop, and HDFS are trademarks or registered trademarks of Apache Software Foundation in the United States and/or other countries.)

Relational databases are organized into tables that consist of rows (also referred to as tuples or records) and columns (also referred to as fields or attributes) of data. A table in a database can be accessed using an index. An index is an ordered set of references (e.g., pointers) to the records in the table. The index is used to access each record in the table using a key (i.e., one of the fields or attributes of the record, which corresponds to a column). A query of the relational database may be described as a request for information based on specific conditions. A query typically includes one or more predicates. A predicate may be described as an element of a search condition that expresses or implies a comparison operation (e.g., A=3).

On the other hand, data in distributed files systems, such as an Apache® Hadoop® Distributed File System (HDFS™), is accessed in the form of directories and files.

SUMMARY

Provided is a method for data movement from a database to a distributed file system. An activity is created that overrides existing security, that is associated with a user, that defines one or more source tables in a relational database and one or more target tables that are available to the user for the activity, and that provides security credentials of an author of the activity for use by the user, wherein the one or more target tables represent data in one or more target files in a file system. The activity is executed using the security credentials of the author to move data in a source table of the one or more source tables to a target file of the one or more target files, wherein a target table of the one or more target tables is defined over the target file. Access is provided to the user to the moved data using the target table.

In addition, provided is a computer system for data movement from a database to a distributed file system. The computer system comprises: one or more processors, one or more computer-readable memories and one or more computer-readable, tangible storage devices, and program instructions, stored on at least one of the one or more computer-readable, tangible storage devices for execution by at least one of the one or more processors via at least one of the one or more memories, to perform: creating an activity that overrides existing security, that is associated with a user, that defines one or more source tables in a relational database and one or more target tables that are available to the user for the activity, and that provides security credentials of an author of the activity for use by the user, wherein the one or more target tables represent data in one or more target files in a file system; executing the activity using the security credentials of the author to move data in a source table of the one or more source tables to a target file of the one or more target files, wherein a target table of the one or more target tables is defined over the target file; and providing access to the user to the moved data using the target table.

Also provided is a computer program product for data movement from a database to a distributed file system. The computer program product comprises a computer readable storage medium having program code embodied therewith, the program code executable by at least one processor to perform: creating an activity that overrides existing security, that is associated with a user, that defines one or more source tables in a relational database and one or more target tables that are available to the user for the activity, and that provides security credentials of an author of the activity for use by the user, wherein the one or more target tables represent data in one or more target files in a file system; executing the activity using the security credentials of the author to move data in a source table of the one or more source tables to a target file of the one or more target files, wherein a target table of the one or more target tables is defined over the target file; and providing access to the user to the moved data using the target table.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
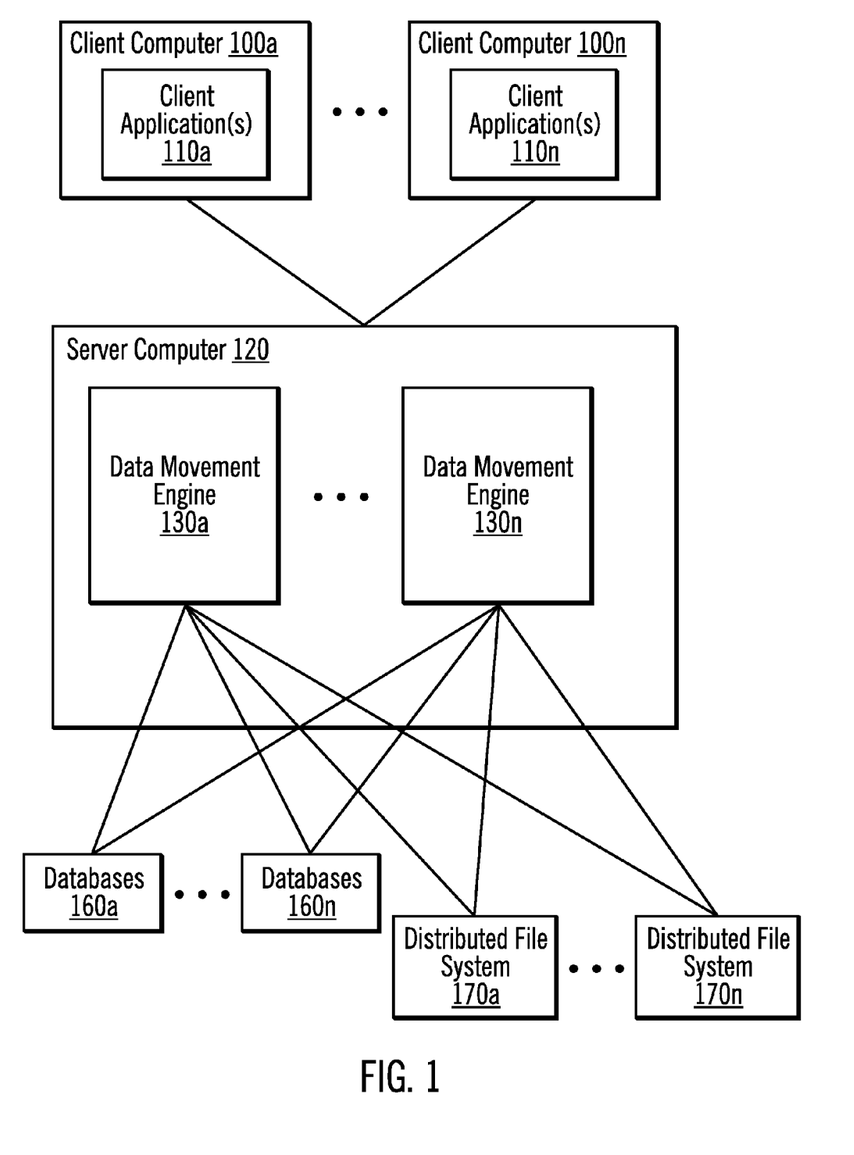
FIG. 1 illustrates, in a block diagram, a computing environment in accordance with certain embodiments.

FIG. 1 illustrates, in a block diagram, a computing environment in accordance with certain embodiments. One or more client computers 100a . . . 100n may be coupled to a server computer 120. Each client computer 100a . . . 100n includes one or more client applications 110a . . . 110n. In certain embodiments, each client application 110a . . . 110n may be a web browser or a rich client. In certain embodiments, each client computer 100a . . . 100n may be a tablet computer, a smartphone or other computing device.

The server computer 120 may include one or more data movement engines 130a . . . 130n. In addition, one or more data movement engines may be part of another computer that is coupled to (or accessible to) the server computer 120. Each data movement engine 130a . . . 130n has connectivity to one or more databases 160a . . . 160n and one or more distributed file systems 170a . . . 170n. Although each data movement engine 130a . . . 130n is shown as coupled to all of the one or more databases 160a . . . 160n and one or more distributed file systems 170a . . . 170n, in various embodiments, each data movement engine 130a . . . 130n may be coupled to fewer or more databases 160a . . . 160n and distributed file systems 170a . . . 170n than other data movement engines 130a . . . 130n.

The one or more databases 160a . . . 160n include source tables, and the data movement engine 130a . . . 130n has connectivity to target tables that correspond to folders and files in the distributed file systems 170a . . . 170n. A client application 110a . . . 110n may issue a request to the server computer 120, which will process the request and invoke one or more of the data movement engine 130a . . . 130n to move data between a database 160a . . . 160n and a distributed file system 170a . . . 170n. In certain embodiments, the distributed file system is an Apache® Hadoop® Distributed File System (HDFS™).

The data movement engine 130a . . . 130n migrates relational data in one or more tables from a database 160a . . . 160n into one or more files in the distributed file system 170, in a secure, efficient fashion. Additionally, in order to then work with data once it is in the distributed file system 170, database-like tools may be used to allow inspection and querying of the data in the files. In certain embodiments, an Apache® Hive® data warehouse software is a database-like layer on top of the files in the Apache® Hadoop® Distributed File System (HDFS™) and allows for querying and managing the data in the files. In certain alternative embodiments, Apache® Hbase™ tables are created on top of the files. (Apache and Hbase are trademarks or registered trademarks of Apache Software Foundation in the United States and/or other countries.)

The data movement engine 130a . . . 130n is able to move data from source tables to target files, additionally providing database-like table structures once (on-demand), periodically or in a continuous manner. The data movement engine 130a . . . 130n is also able to handle field/row delimiters when handling data (e.g., a Binary Large Objet (BLOB), Character Large Object (CLOB), etc.) that contains these delimiters.

In addition, the data movement engine 130a . . . 130n provides security for data movement. The data movement engine 130a . . . 130n provides security not only while the data is in transit from the source table to the file, but also once the data is in the file and is available via target tables. With the data movement engine 130a . . . 130n, certain users may define which databases 160a . . . 160n have data that should be able to be moved to a distributed file system 170a . . . 170n and which set of users are allowed to move the data, and, hence, view the data in the file or target tables. Further, with the data movement engine 130a . . . 130n, certain users have access to certain target tables, and, by extension, to the corresponding files in the distributed file system 170.

Figure 2:
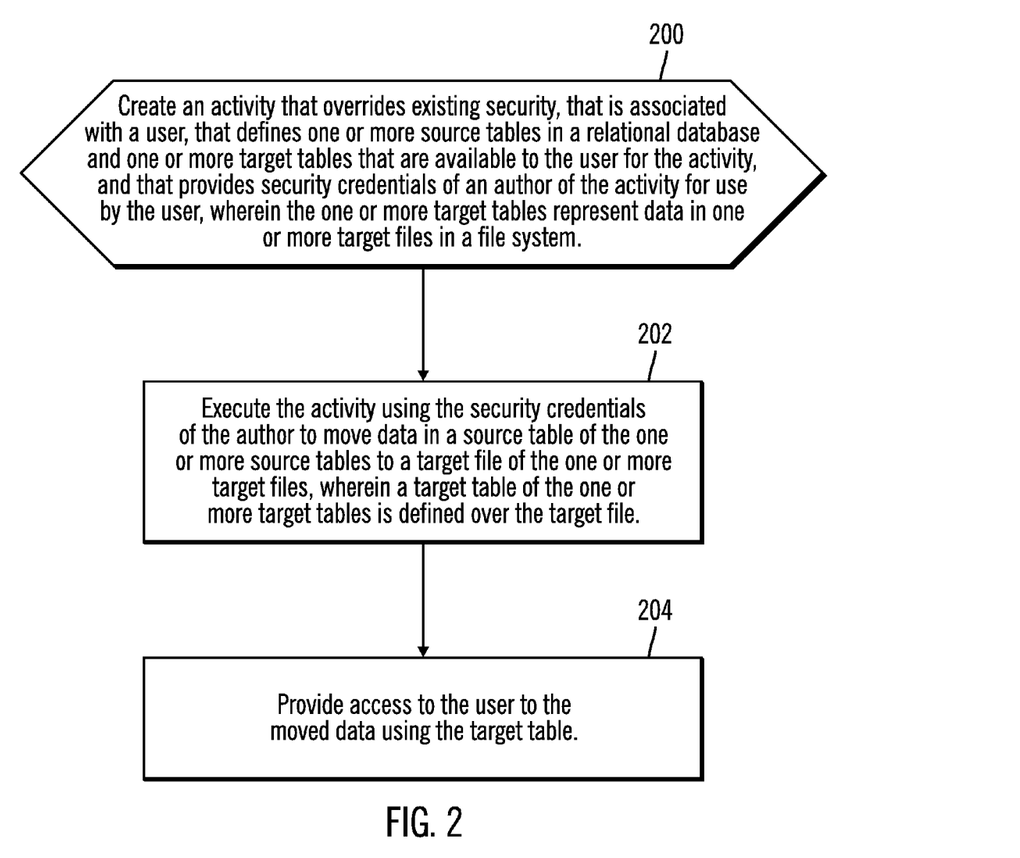
FIG. 2 illustrates, in a flow diagram, operations performed by the data movement engine in accordance with certain embodiments.

FIG. 2 illustrates, in a flow diagram, operations performed by the data movement engine 130a . . . 130n in accordance with certain embodiments. Control begins at block 200 with the data movement engine 130a . . . 130n creating an activity that overrides existing security, that is associated with a user, that defines one or more source tables in a relational database and one or more target tables that are available to the user for the activity, and that provides security credentials of an author of the activity for use by the user, wherein the one or more target tables represent data in one or more target files in a file system. In certain embodiments, the data movement engine 130a . . . 130n overrides existing security for the data by changing the permissions of the files and making them accessible to the users of the activities.

In block 202, the data movement engine 130a . . . 130n executes the activity using the security credentials of the author to move data in a source table of the one or more source tables to a target file of the one or more target files, wherein a target table is defined over the target file. In certain embodiments, the data is moved to a target file and a target table is defined that accesses data from the file. Thus, the data movement engine 130a . . . 130n defines a target table on top of the target file. When a user tries to read data from the target table, data is read from the target file and returned to the user. In various embodiments, the data is moved (1) with continuous replication of the data, (2) on-demand, via repeatable activities, or (3) on a schedule via repeatable activities.

In block 204, the data movement engine 130a . . . 130n provides access to the user to the moved data using the target table. That is, a user may issue a query to the target table, and the data is retrieved from a corresponding target file and returned. In certain embodiments, data may be accessed in the distributed file system: 1) by directly accessing the files using Apache® Hadoop® Distributed File System (HDFS™) file Application Program Interfaces (APIs) or 2) by using the Apache® Hive® data warehouse software SQL queries. The files may be accessed using this mechanism if a target table has been defined on top of a file. In certain embodiments, the user may issue a database statement (e.g., SELECTxFROM table y) against the target table, data for the request is retrieved from the target file (e.g., by mapping the columns of the target table to lines ("rows") of data in the target file (e.g., the CSV file), and this data is returned in row format in response to the database statement.

In certain embodiments, the data movement engine 130a . . . 130n reads data (e.g., using SELECT statements) from the source tables, converts the data to a target file (e.g., a Comma-Separated Values (CSV) file), and stores the target file in the distributed file system (e.g., an Apache® Hadoop® Distributed File System (HDFS™)). Then, the data movement engine 130a . . . 130n may perform a CREATE statement (e.g., using the Apache® Hive® data warehouse software) to create a target table and point the target table to the target file that was created. In certain embodiments, the data movement engine 130a . . . 130n may specify alternate delimiters to just commas as well.

In certain embodiments, the data movement engine 130a . . . 130n enables a user to easily move data from a database 160a . . . 160n (e.g., a relational source) to a distributed file system 170. In certain embodiments, the data movement engine 130a . . . 130n performs the movement of data by creating one or more target tables (e.g., using the Apache® Hive® data warehouse software) on top of the files, thereby enabling the user to read the data from the target table.

The data movement engine 130a . . . 130n enables continuous replication of data from the source tables to the target tables. The data movement engine 130a . . . 130n may make use of an index and multiple files to store the data from the source table. The data movement engine 130a . . . 130n may use the index to update one of the files so as to replicate the changes in the source table onto the target table. The data movement engine 130a . . . 130n enables handling of data containing characters that are used as delimiters in the target table. The data movement engine 130a . . . 130n may make use of a map-reduce job to handle the special characters and provide an alternative mechanism to read data from the target table.

In certain embodiments, the data movement engine 130a ... 130n handles security, including target table/file permissions, automatic lineage, and policy enforcement. Additionally the ability to use different data movement engines 130a ... 130n, based upon use-case needs is also a distinguishing factor. In certain embodiments, the data movement engine 130a ... 130n allows permissions on the target table/files to be changed so as to ensure that the user has sufficient permissions to read/write data from the target table, which was created using the credentials (also referred to as security credentials) of an author.

An administrator ("admin" or "author") may define an activity. For the activity, there may be many source databases and many schemas or tables in the information topology. However, the administrator may not want to make all of these sources available to users (e.g. for example, there are 1000 tables). There may also be hundreds of directories in the distributed file system. An administrator may define an activity as follows:

Name—Customer Data
Sources Available: CUST_001 and CST_002
Targets Available: FOLDER_14, FOLDER_15
Credentials for user to access sources:
CUST_001—user-admin1 password-foo
CUST_002—user-admin2 password-bar
Credentials for user access to targets:
FOLDER_14—user-someuser1 password-asdf
FOLDER_15—user: someuser2 password-qwerty
Policy Options:
Field Delimiter-, (COMMA)
Maximum rows to extract from each source—10,000
Maximum number of tables to extract: 10
Allow access to users: user1, user2

The administrator saves this activity. Then, a user1 opens the client application. The user is able to see an activity called Customer Data. A user3 would not be able to see Customer Data. the user1 selects Customer Data and clicks "Run". The user1 can see the sources and targets defined, The user1 can choose one or both of CUST_001 and CUST_002. The user1 then chooses from one or both of FOLDER_14 and FOLDER_15. When the user 1 selects an "Offload" option, the user1 can then review what is about to happen, including the source to target mappings, the resultant file locations, and the table names. When the user1 selects a "Submit" option, data movement starts and may be monitored from within the client application 110a ... 110n.

In certain embodiments, with reference to security, an administrator defines what sources/targets are available to users on an activity-by-activity basis. This allows control over what data can be moved from which source to which target. With embodiments, user-level access to activities is also defined by the administrator, further controlling who can run what activities. Moreover, connection information, including user/password may be configured by an administrator so that users do not need direct personal access to the sources/targets. In addition, the permissions may be changed at group level to support access to end users, where the group information is requested from the administrator at activity creation time. This means that data in the target may be shared with a group of users as opposed to just the user that triggered the data movement, for both the file in the distributed file system 170, as well as, the corresponding target table that is created.

With embodiments, the data movement engine 130a ... 130n provides automatic enforcement of policy, such as maximum number of rows per table and a maximum number of tables.

The data movement engine 130a ... 130n may also re-use activities for repeatable data movements. Once activities are defined by an administrator, the activities may be re-run on-demand (e.g., manually), on a schedule, or in continuous replication mode (e.g., whenever the data movement engine 130a ... 130n detects changes to the source data, the changes are automatically replicated to the target data).

The data movement engine 130a ... 130n provides automatic lineage (not just auditability of who moved what, but physically what data came from which source table). In certain embodiments, the data movement engine 130a ... 130n keeps track of the various activities and their runs. An administrator is able to see a graphical representation of activity and runs of that activity. This enables the administrator to see what is happening and understand the different data movements that have been executed using the data movement engine 130a ... 130n.

The data movement engine 130a ... 130n makes use of different data movement tools to move the data from a database 160a ... 160n to a distributed file system 170a ... 170n. The data movement engine 130a ... 130n may make use of Extract, Transform, and Load (ETL) tools, as well as, change data capture technology. The data movement engine 130a ... 130n (1) simplifies the data movement process, (2) ensures that all the data is moved (irrespective of presence of special delimiter characters), (3) supports continuous replication of data from the source table to the target table, (4) ensures that governance is not compromised, and (5) ensures that the end user is able to access the moved data using the security of the distributed file system 170. When the distributed file system 170a ... 170n is an Apache® Hadoop® Distributed File System (HDFS™), the security system of the underlying technology (e.g., ETL) may be different.

Governance may be described as the who, what, when, where, why of data/metadata. That is, governance describes who did something, were they allowed to do it, what did they do, when did they do it, and to what end. In certain embodiments, certain users are allowed to define what can be done, and certain users are allowed to then move the data (based on the activity information). Additionally, the data movement engine 130a ... 130n and the server computer 120 both capture what exactly was moved and to where (and when) allowing embodiments to provide lineage information such that a user may look at a dataset and determine where in the information topology that dataset came from, if it was transformed, etc.

The proposed system has two different kinds of users: author and user. With embodiments, the author is responsible for defining an activity. The activity may be defined using a Graphical User Interface (GUI). The author may specify information about the sources, target, connections to use, policies, and the security options. The security options may include: a) the list of users with whom the activity is shared, and these users are allowed to access the activity, and b) user group selection. The user group selection enables the author to select the user group with whom the created target tables will be shared.

The author may associate a lifespan with the moved data. That is, the author may specify the time limit for which the moved data needs to exist. This may be specified in terms of months/days, etc. This ensures that data gets cleaned up regularly. The data movement system 130a ... 130n ensures the enforcement of this policy.

Once the activity is created and shared with the user, the user will be able to see the activities in a central console. The user will be able to "run" any of the shared activities. While running the activity, the user may specify whether the activity is to be run once, periodically or continuously.

Once the user has run the activity, the system makes use of the ETL tool to perform various tasks, such as data movement (reading data from relational system and moving it to the distributed file system) and target table creation (creation of a target table for each source table).

While running an activity, the user has an option to specify that the source table should be continuously replicated with the target table. With certain embodiments (e.g., in which Apache® Hive® data warehouse software tables are used), if the target table fetches the data from flat files, whenever the source table changes, the data movement engine 130a . . . 130n makes corresponding updates in the flat files.

In certain embodiments, the data movement engine 130a . . . 130n supports continuous replication using the following approach: data is written to the distributed file system 170a . . . 170n in the form of multiple files. For example, if the source table contains 1000 rows, the data movement engine 130a . . . 130n may create 10 files, each with 100 rows. These files are present in the folder that is mapped to the target table. Also, the data movement engine 130a . . . 130n creates an index that maps the source data to the target data file and maps the start and end offset of the row in the file.

The data movement engine 130a . . . 130n may use the change data capture technology to capture the change log in the source table. The change log contains information, such as Row "1, M" got inserted. Or Row "2, Al" got changed to "2, Albert". The change log is written to the distributed file system 170a . . . 170n by the change data capture technology.

The data movement engine 130a . . . 130n may pick up the changes (e.g., by polling the source tables periodically). If a row is inserted, the data movement engine 130a . . . 130n adds the row to a latest file and updates the index accordingly. If a row is updated, the data movement engine 130a . . . 130n uses the index to find out the file in which the record is present, checks whether the new value is the same length as the previous, and, if so, updates the file inplace (e.g., by overwriting data to an existing file rather than deleting the file and recreating the file). If the new data is larger/smaller than the original, then the data movement engine 130a . . . 130n creates a new file that is a copy of the original with the row changed. Then, the old file may be overwritten using the new file using a move command (which is an atomic operation). In this manner, the data movement engine 130a . . . 130n enforces continues updates.

Some systems, such as Apache® Hive® data warehouse software, support a limited set of characters as field delimiters. For example, the record delimiter is fixed and is \n. Further, there may not be a concept of escaping the delimiters. Hence, the delimiters cannot appear in the source data. However, when data is being moved from the source tables, the data movement engine 130a . . . 130n parses the data to find out whether the data contains a field or record delimiter. If yes, for each column, the data movement engine 130a . . . 130n creates a new column that will store the indexes of the delimiters in the text. Then, the data movement engine 130a . . . 130n removes the delimiters from the original text before it is written to the distributed file system 170. The data movement engine 130a . . . 130n populates the additional column with the indexes of the record/field delimiters. In certain embodiments, two additional columns may be used for this.

The data movement engine 130a . . . 130n provides a map-reduce job to parse the indexes contained in the additional column, reconstructs the data, and returns the data to the user. Customers may use the map-reduce job to fetch data from the target table. The map-reduce job is able to find whether the table contains data with delimiters. If not, the map-reduce job returns the results of the target table query back to the user.

Thus, if the data contains delimiters, then the map-reduce job parses the indexes, inserts the record/field delimiters, and returns the data to the user. In certain embodiments, the map process filters a subset of the data from the target table. The key generated by the map process may be a random number (as there is no need to correlate the data). In certain embodiments, the reduce process does the actual insertion of the field/record delimiters in the data.

For example, if the input data is:
"John Smith", "99, Rainbow Dr, \n NewLand"
The second column contains the record (\n) as well as field delimiter (,). The index columns generated for this data would be:
Field Delimiter Index: 3, 15 (index of comma)
Row delimiter index: 17 (index of \n)
If the above data is stored as is, the results of a "select*from <table_Name>" query will be:
"John Smith","99".
However, the map-reduce job inserts the field/record delimiters and returns the actual data of:
"John Smith", "99, Rainbow Dr, An NewLand"

The data movement engine 130a . . . 130n ensures that the user who is moving the data is able to access it using the target tables, even though the data is moved using the credentials of the author. Consider the following scenario: A1 is an author of an activity. This activity is run by User U1. A1 provides distributed file system credentials while creating the activity. The ETL job makes use of these distributed file system credentials of the author while connecting to the distributed file system 70. Hence, the files that are created in the distributed file system 170a . . . 170n are created using A1's credentials. A1 is typically an administrator.

The data movement engine 130a . . . 130n does the following: when A1 creates the activity, the data movement engine 130a . . . 130n connects to the distributed file system 170a . . . 170n and finds the list of groups to which A1 belongs and asks A1 to select one of the groups. Then, the files that are created in the distributed file system 170a . . . 170n are shared with this group. When A1 and U1 are in the same group, U1 is able to access the files that A1 created. In addition, when A1 creates the activity, A1 may also specify credentials different from A1's credentials, such that A1 does not need to be in same group as U1. In this case, A1 would specify credentials that are in U1's group instead of A1's group. With such embodiments, the user avoids having to provide any additional information and just uses the credentials of the author.

In certain embodiments, there is a user interface for creation of an activity (typically used by an author) and there is a wizard for running of an activity (typically used by a user). In certain embodiments, one individual may be both author and user. In such embodiments, the two wizards for creation of activity and running may be combined. In the combined wizard, the operations outlined for creating an activity would remain as is, and the additional operations of specifying target table options and periodicity of execution may be added to the combined wizard.

The data movement engine 130a . . . 130n ensures lifespan of data. In certain embodiments, the data movement engine 130a . . . 130n keeps track of the various sandboxes that have been created and keeps track of the time duration of each sandbox. If the time duration for a sandbox approaches the maximum time duration specified by the author, the data movement engine 130$a$ . . . 130$n$ sends an email reminder to the user who created the sandbox. The user may have an option to contact the author and seek to override the policy. The data movement engine 130$a$ . . . 130$n$ may support such an override option. If there is no override request, then the data movement engine 130$a$ . . . 130$n$ deletes the sandbox and the associated target tables.

Sandboxes may be described a concept in which an analyst or other user interested in working with data can get a "copy" of the data and work with the copy of the data (e.g., modify/ transform the data) such that analysis/reporting tools may be used on the copy of the data without affecting the source system data (which may be master data (reference data) or production warehouse data).

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
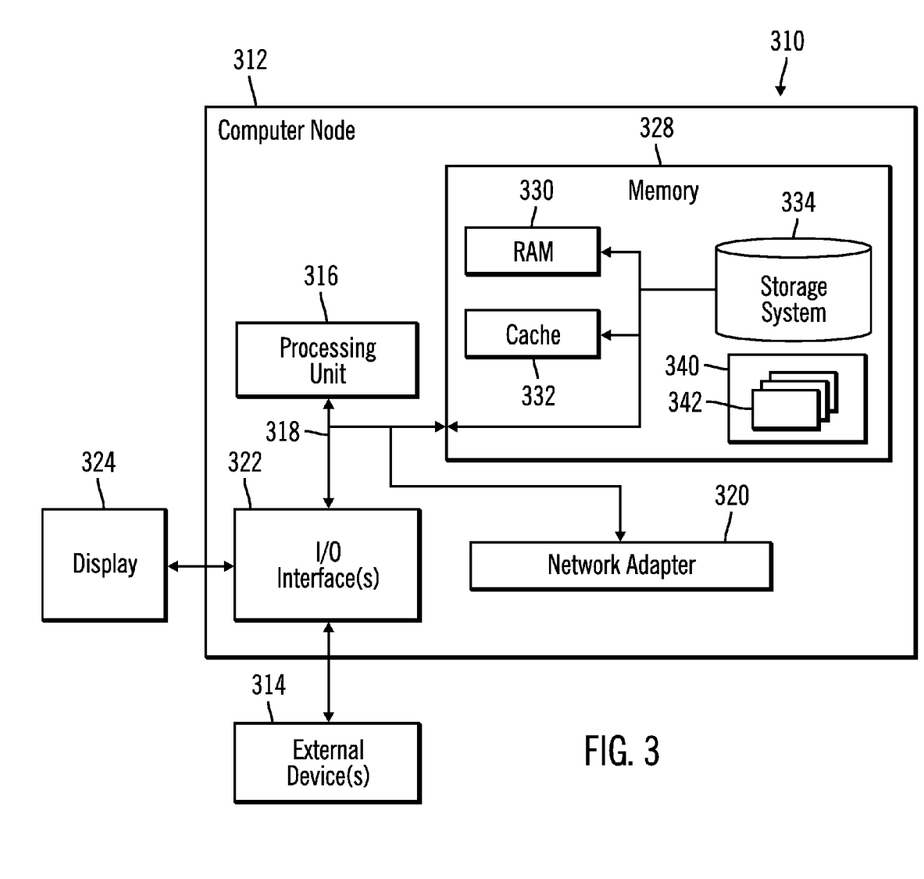
FIG. 3 illustrates a cloud computing node in accordance with certain embodiments.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/ server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
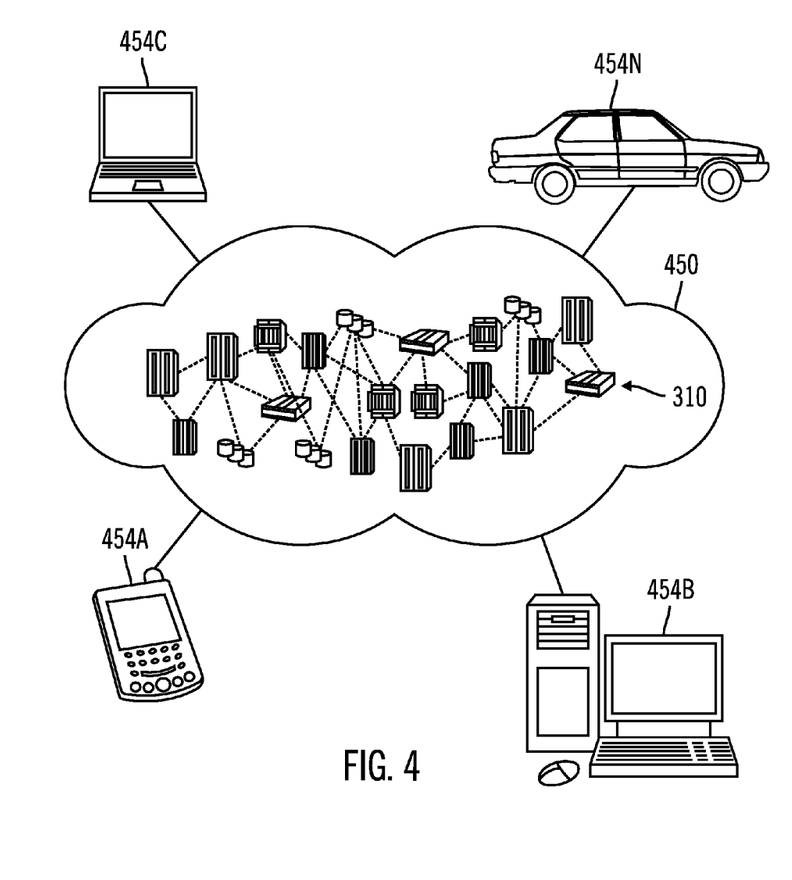
FIG. 4 illustrates a cloud computing environment in accordance with certain embodiments.

Referring now to FIG. 4, illustrative cloud computing environment 450 is depicted. As shown, cloud computing environment 450 comprises one or more cloud computing nodes 310 with which local computing devices used by cloud consumers, such as, for example, personal digital assistant (PDA) or cellular telephone 454A, desktop computer 454B, laptop computer 454C, and/or automobile computer system 454N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 310 and cloud computing environment 450 can communicate with any type of computerized device over any type of network and/or network addressable connection (e.g., using a web browser).

Figure 5:
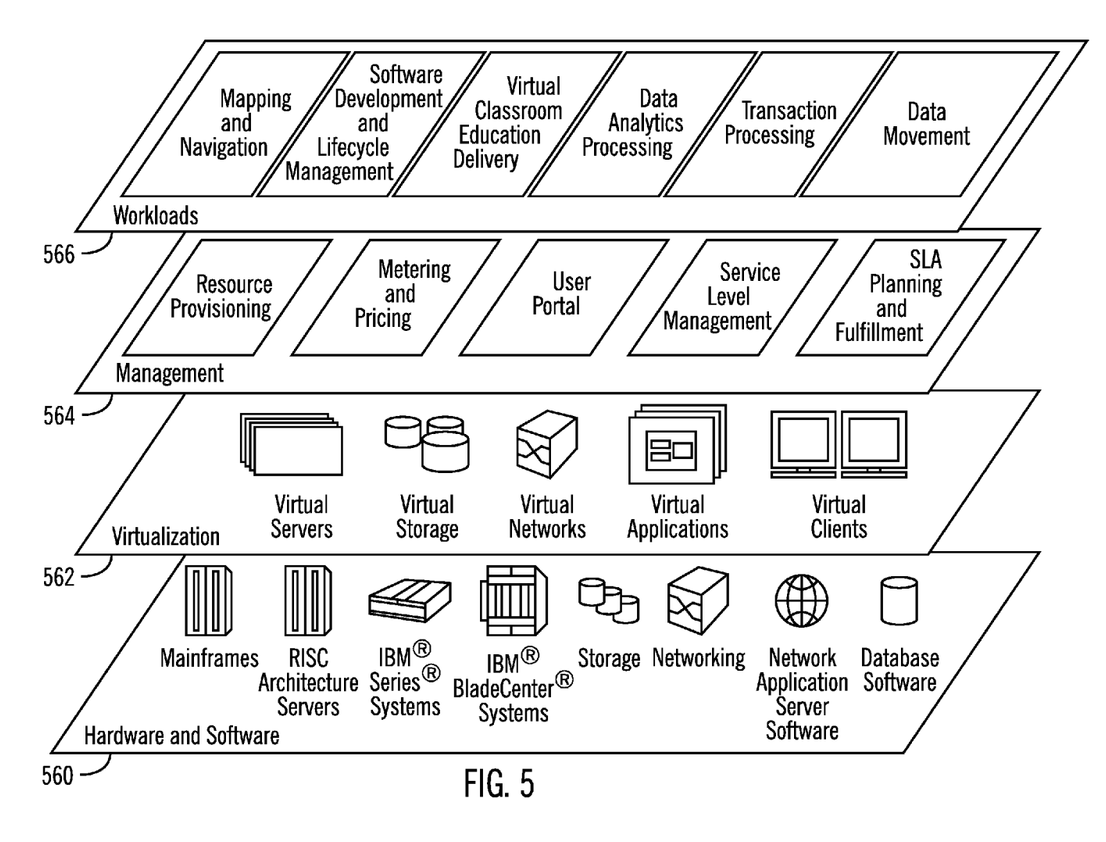
FIG. 5 illustrates abstraction model layers in accordance with certain embodiments.

Referring now to FIG. 3, a set of functional abstraction layers provided by cloud computing environment 450 (FIG. 4) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data movement.

Thus, in certain embodiments, software or a program, implementing data movement in accordance with embodiments described herein, is provided as a service in a cloud environment.

In certain embodiments, the client computers 100a . . . 100n and/or the server computer 120 has the architecture of computing node 310. In certain embodiments, the client computer 100a . . . 100n and/or the server computer 120 is part of a cloud environment. In certain alternative embodiments, the client computer 100a . . . 100n and/or the server computer 120 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations of:

creating an activity that overrides existing security, that is associated with a user, that defines one or more source tables in a relational database that are available to the user for the activity, and that provides security credentials of an author of the activity for use by the user;

executing the activity using the security credentials of the author to move relational data in a source table of the one or more source tables to the file system by:

reading the relational data;

converting the read relational data to a target file in the file system, wherein the data in the target file is not relational;

defining a target table over the target file;

creating an index that maps the relational data to data in the target file; and providing access to the user to the data in the target file in the file system using the defined target table and the created index.

2. The computer system of claim 1, wherein the data is moved by one of on-demand, by schedule, and continuously.

3. The computer system of claim 1, wherein the operations further comprise:

enabling handling of the data, wherein the data contains characters that are used as delimiters in the defined target table by making use of a map-reduce job to handle the delimiters.

4. The computer system of claim 1, wherein the operations further comprise:

providing a lineage graph of data movement that shows (a) a source of an activity performing the data movement (b) information about the activity performing the data movement, (c) a folder in which one or more files are created, and (d) one or more target tables created by the activity performing the data movement.

5. The computer system of claim 1, wherein an author specifies at least one value to control a volume of the data that can be moved.

6. The computer system of claim 1, wherein a Software as a Service (SaaS) is configured to perform the system operations.

7. The computer system of claim 1, wherein the user accessing the activity specifies at least one control value to affect a location to which data is moved from the source table.

8. The computer system of claim 1, wherein the created index is used to update the defined target file in the file system.

9. A computer program product, the computer program product comprising a computer readable storage medium having program code embodied therewith, the program code executable by at least one processor to perform:

creating an activity that overrides existing security, that is associated with a user, that defines one or more source tables in a relational database that are available to the user for the activity, and that provides security credentials of an author of the activity for use by the user;

executing the activity using the security credentials of the author to move relational data in a source table of the one or more source tables to the file system by:

reading the relational data;

converting the read relational data to a target file in the file system, wherein the data in the target file is not relational;

defining a target table over the target file;

creating an index that maps the relational data to data in the target file; and providing access to the user to the data in the target file in the file system using the defined target table and the created index.

10. The computer program product of claim 9, wherein the data is moved by one of on-demand, by schedule, and continuously.

11. The computer program product of claim 9, wherein the program code is executable by the at least one processor to perform:

enabling handling of the data, wherein the data contains characters that are used as delimiters in the defined target table by making use of a map-reduce job to handle the delimiters.

12. The computer program product of claim 9, wherein the program code is executable by the at least one processor to perform:

providing a lineage graph of data movement that shows (a) a source of an activity performing the data movement (b) information about the activity performing the data movement, (c) a folder in which one or more files are created, and (d) one or more target tables created by the activity performing the data movement.

13. The computer program product of claim 9, wherein an author specifies at least one value to control a volume of the data that can be moved.

14. The computer program product of claim 9, wherein a Software as a Service (SaaS) is configured to perform the computer program product operations.

15. The computer program product of claim 9, wherein the user accessing the activity specifies at least one control value to affect a location to which data is moved from the source table.

16. The computer program product of claim 9, wherein the created index is used to update the defined target file in the file system.

* * * * *